United States Patent Office
3,284,462
Patented Nov. 8, 1966

3,284,462
2-AROXAZOLYL-5-ARYL-THIOPHENE
COMPOUNDS
Peter Liechti, Binningen, Basel-Land, Leonardo Guglielmetti, Basel, Erwin Maeder, Aesch, Basel-Land, and Emil Adolf Siegrist, Basel, Switzerland, assignors to Ciba Limited, Basel, Switzerland, a Swiss company
No Drawing. Filed Nov. 23, 1964, Ser. No. 413,287
Claims priority, application Switzerland, Nov. 25, 1963, 14,454/63
16 Claims. (Cl. 260—307)

The present invention concerns new, valuable 2-aroxazolyl-5-aryl-thiophene compounds corresponding to the general formula (1) 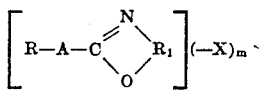

wherein R represents a benzene or naphthalene radical, A a thiophene radical linked in 2-position to the oxazole ring and in 5-position to R, and $R_1$ a benzene or naphthalene radical, two adjacent ring carbon atoms of which belong at the same time to the oxazole ring, X represents a sulfonyl halide group, especially a sulfonyl chloride or a sulfonyl fluoride group, a sulfonic acid ester group, a sulfonamide group which may be N-substituted, or a radical of the formula (2)     —SO$_2$—W wherein W signifies an organic substitutent bound by one carbon atom directly to the sulfur atom of the sulfonyl group, and $m$ stands for 1, 2 or 3.

The radicals R and $R_1$ may be naphthalene radicals, but they preferably represent benzene radicals. The latter may contain further substituents, e.g. alkyl or alkoxy groups, halogen atoms such as chlorine or fluorine, phenyl groups, phenyl alkyl groups, moreover cycloalkyl groups such as in particular cyclohexyl.

Among these new 2-aroxazolyl-5-aryl-thiophene compounds of the Formula 1 special mention is made of those corresponding to the general formula (3) 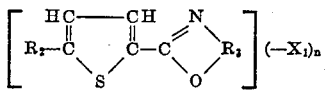

wherein $R_2$ represents a benzene radical and $R_3$ a benzene radical, two adjacent ring carbon atoms of which belong at the same time to the oxazole ring, $n$ stands for 1 or 2, and $X_1$ represents a sulfonyl chloride or sulfonyl fluoride group, an alkyl sulfonate, alkenyl sulfonate, aryl sulfonate or aralkyl sulfonate group, a sulfonamide group of the formula (4) 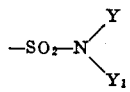

or a radical of the formula (5)     —SO$_2$—W$_1$ wherein Y signifies a hydrogen atom, an alkyl or hydroxyalkyl group and $Y_1$ a hydrogen atom, an alkyl, alkenyl, hydroxyalkyl, carboxyalkyl or alkoxyalkyl group, an amino akyl group, which may be further substituted on the nitrogen, or an aralkyl radical, where Y and $Y_1$ in Formula 4 together with the nitrogen atom may form a 3- to 6-membered heterocyclic ring, and $W_1$ in Formula 5 stands for an alkyl, hydroxyalkyl, halogenalkyl, sulfatoalkyl or alkenyl group or for an aryl or aralkyl radical.

In accordance with a preferred type of modification of the present invention such thiophene derivatives of the general Formula 3 are of special interest, wherein $R_2$ represents a benzene radical and $R_3$ a benzene radical, two adjacent ring carbon atoms of which belong at the same time to the oxazole ring and which may contain one or several, preferably 1 to 2, alkyl groups with 1 to 4 carbon atoms or a phenyl group, $n$ stands for 1 or 2, and $X_1$ signifies a sulfonyl chloride or sulfonyl fluoride group, an alkyl sulfonate or arylsulfonate group, a sulfonamide group of Formula 4 or a radical of Formula 5, wherein Y signifies a hydrogen atom, an alkyl or hydroxyalkyl group and $Y_1$ a hydrogen atom, an alkyl, alkenyl, hydroxyalkyl, carboxyalkyl or alkoxyalkyl group each containing up to 20, preferably up to 6 carbon atoms, an amino alkyl group, which may be further substituted on the nitrogen, such as for example (6) 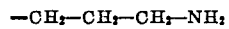
(7) 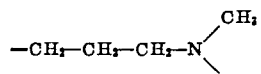
(8) 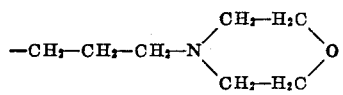

and (9) 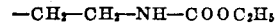

and wherein $W_1$ stands for an aryl radical, especially a phenyl radical.

The following are sub-groups of types of compounds which are of preferred practical interest in accordance with the above Formula 3

(I) Compounds in accordance with Formula 3 wherein $X_1$ signifies a sulfonyl halide group of the sulfonyl chloride or sulfonyl fluoride group;

(II) Compounds in accordance with Formula 3 wherein $X_1$ stands for unsubstituted sulfonamide groups (—SO$_2$NH$_2$)$_n$ with $n=1$ to 2;

(III) Compounds in accordance with Formula 3 with the radical in accordance with Formula 4 wherein Y signifies a hydrogen atom and $Y_1$ an alkyl, hydroxyalkyl, carboxyalkyl or alkoxyalkyl group;

(IV) Compounds in accordance with Formula 3 with the radical in accordance with Formula 4, wherein Y and $Y_1$ are identical and represent a hydroxyalkyl group, preferably a hydroxy-ethyl group.

Besides the selected classes of compounds described above, it is also possible to prepare and use such thiophene derivatives in accordance with Formula 3 in which $X_1$ represents e.g. an alkenyl sulfonate or aralkyl sulfonate group or in which $Y_1$ in accordance with Formula 4 stands for an aralkyl radical, as well as types in which Y and $Y_1$ in accordance with Formula 4 may together with the nitrogen atom form a 3- or 6-membered heterocyclic ring, e.g. a group

(10) 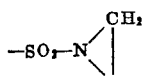

(11) 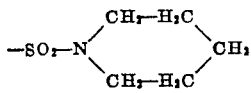

or

(12) 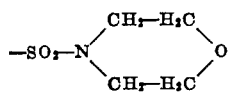

and $W_1$ in the Formula 5 stands for an alkyl, hydroxyalkyl, halogenalkyl, sulfatoalkyl or alkenyl group, such as e.g.:

(13) $-CH_3$
(14) $-CH_2-CH_3$
(15) $-CH_2-CH_2OH$
(16) $-CH_2-CH_2Cl$
(17) $-CH_2-CH_2-OSO_3\text{-cation}$
(18) $-CH=CH_2$ and

(19) $-CH_2-CH=CH_2$ or for a group of formula

(20) 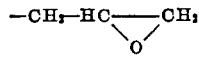

The new 2-aroxazolyl-5-aryl-thiophene compounds of Formula 1 can be obtained in analogy to known methods, for example by introducing, with the help of sulfonating agents, such as sulfuric acid or chlorosulfonic acid, 1 to 3 sulfonic acid groups into 2,5-disubstituted thiophene compounds of formula

(21) 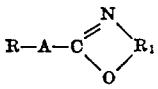

wherein A, R and $R_1$ have the significance specified above, and then converting these sulfonic acid groups in a known manner, e.g. by means of phosphorus oxychloride in inert organic solvents, such as chlorobenzene, or of thionyl chloride, into sulfonyl chloride groups, and, if necessary, converting the sulfonyl chloride groups, also in accordance with known methods, into other sulfonyl halide groups, into sulfonic acid ester groups, into sulfonamide groups, which may be N-substituted, or into groups of the aforementioned Formula 2.

The 2,5-disubstituted thiophene compounds of Formula 21, serving as starting material, are either known or may be prepared in accordance with known methods, for example by preparing mono-carboxylic acids of formula

(22) R—A—COOH wherein R stands for a benzene or naphthalene radical, and A represents a thiophene radical linked in 2-position to the carboxyl group and in 5-position to R, or by reacting functional derivatives of these mono-carboxylic acids at elevated temperatures of e.g. 120° to 260° C., preferably in the presence of catalysts, such as in particular boric acid, with o-hydroxyamino compounds of formula

(23) 

wherein $R_1$ represents a benzene or naphthalene radical which contains $-NH_2$ and $-CH$ bonded to it in adjacent positions.

The new 2-aroxazolyl-5-aryl-thiophene compounds of the composition described above possess, as a rule, in dissolved or in finely dispersed condition a more or less pronounced fluorescence and may be used for the optical brightening of the most varied organic materials. Good results have been achieved, for example, in the brightening of acrylic resin lacquers, alkyd resin lacquers, cellulose ester lacquers, e.g. acetyl cellulose lacquers or nitrocellulose lacquers, furthermore in the optical brightening of natural fibers, such as cotton or wool, or of synthetic fibers, e.g. of those of cellulose esters, such as cellulose propionate or acetyl cellulose (cellulose diacetate or cellulose triacetate; acetate silk), polyamides (e.g. nylon), polyesters (e.g. "Dacron," "Terylene") or of polyolefins such as polyethylene and polypropylene, of polyvinyl chloride or polyvinylidene chloride, as well as of films, foils, tapes or mouldings from these synthetic materials or other materials, such as polystyrene, polyvinyl alcohol or polyvinyl esters of organic acetates, e.g. polyvinyl acetate.

So far as fibers, which may be present as staple fibers or endless fibers, in raw condition, in the form of hanks or of fabric, can be optically brightened in accordance with the invention, this is done advantageously in aqueous medium in which the corresponding compounds are suspended or dissolved. If necessary, dispersing agents can be added in the treatment, e.g. soaps, polyglycol ethers of fatty alcohols, fatty amines or alkyl phenols, cellulose sulfite waste liquor or condensation products of possibly alkylated naphthalene sulfonic acids with formaldehyde. It has been shown to be particularly appropriate to work in a neutral, weakly alkaline or acid bath. It is also advantageous to carry out the treatment at elevated temperatures of approx. 50 to 100° C., for example at the boiling temperature of the bath or in its vicinity (approx. 90° C.). Solutions in organic solvents can also be considered for the treatment in accordance with the invention.

Moreover, the new 2-aroxazolyl-5-aryl-thiophene compounds of Formula 1, which are to be used in accordance with the invention, may be added to, or incorporated with, the materials before or during their forming. Thus, they may be dissolved or finely distributed in the spinning mass before the spinning, or be added to the moulding composition in the manufacture of films, foils, tapes or mouldings. The new 2-aroxazolyl-5-aryl-thiophene compounds may also be added to reaction mixtures before or during the polycondensation to, for example, polyamides or polyesters, or to polymerization masses before or during the polymerization of monomers such as, for example, vinyl acetate.

The quantity of the new thiophene derivatives to be used in accordance with the invention, related to the material to be optically brightened, may vary over a wide range. Even with very small quantities, in certain cases, for example, such of 0.01%, a clear and lasting effect can be achieved. It is also possible, however, to apply quantities of up to approx. 2%.

The new 2-aroxazolyl-5-aryl-thiophene compounds of Formula 1 to be used as brightening agents may also be applied as follows:

(a) In admixture with dyes or pigments, or as an additive to dye baths, print, discharge or resist paste. Moreover, for the after treatment of dyeings, printings or discharge printings;

(b) In admixture with chemical bleaches or as an additives to bleach baths;

(c) In admixture with finishing agents, such as starch or synthetic finishings. The products in accordance with the invention may be added, for example, to the bath used for the achievement of a crease-resistant finish.

(d) In combination with detergents. The detergent and the brightening agent may be added separately to the washing baths. It is also advantageous to employ detergents to which the brightening agent has previously been added. Suitable detergents, are, for example, soaps, salts of sulfonate detergents such as e.g. of sulfonated benzimidazoles, substituted on the 2-carbon atom by higher alkyl radicals, moreover, salts of mono-carboxylic acid esters of 4-sulfophthalic acid with higher fatty alcohols, moreover salts of fatty alcohol sulfonates, alkylaryl sulfonic acids or condensation products of higher fatty acids with aliphatic hydroxy or amino sulfonic acids. Furthermore, non-ionic detergents may be used, e.g. polyglycol ethers deriving from ethylene oxide and higher fatty alcohols, alkyl phenols or fatty amines.

If the present process is combined with other treatment or finishing methods, the combined treatment is advantageously carried out with the help of suitable preparations. These stable preparations are characterized in that they contain new compounds of the formula specified above (1) as well as dispersing agents, detergents, dyes, pigments or finishing agents.

The compounds of the formula specified at the beginning (1) may moreover be applied fixed on a carrier material present in fine distribution.

In the following examples, unless there is an indication to the contrary, parts are to be understood to mean parts by weight and percent to mean percent by weight.

*Example 1*

13.8 parts of the compound of formula

(24) 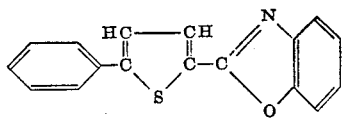

are introduced into 66 parts by volume of ice-cold chlorosulfonic acid. Subsequently the mixture is stirred for 15 minutes at 15° C. Then 27 parts by volume of thionyl chloride are added at 15° C. with stirring. After 30 minutes, the reaction mixture is added dropwise to a well-stirred mixture of 1300 parts by volume of chloroform and 800 parts of ice. The chloroform layer is separated, dried with sodium sulfate and evaporated to dryness in vacuum on a water bath.

16 parts of a compound of formula

(25) 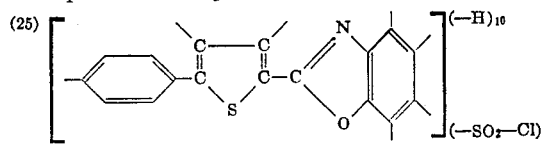

are obtained in the form of a yellow powder with a melting point of 180 to 184° C.

In an analogous manner there is obtained from the compound of formula

(26) 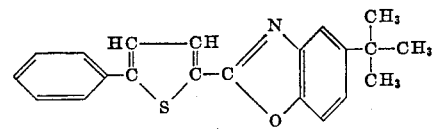

the sulfonyl chloride of formula

(27) 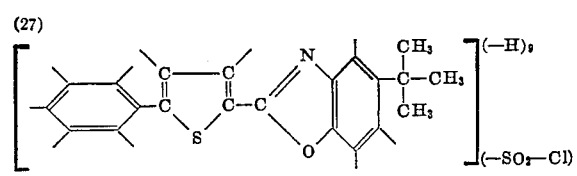

Melting point: 233 to 235° C.

In an analogous manner there is obtained from the compound of formula

(28) 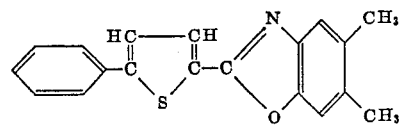

the sulfonyl chloride

(29) 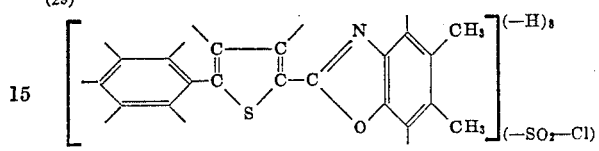

Melting point: 233 to 235° C.

In an analogous manner there is obtained from the compound of formula

(30) 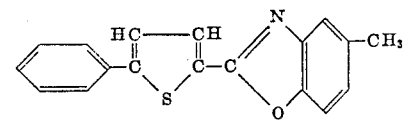

a mixture of two sulfonyl chlorides of formulae

(31) 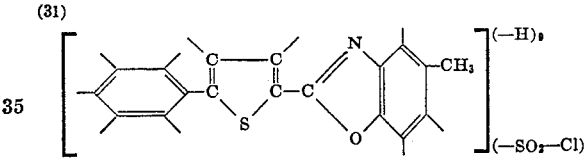

(32) 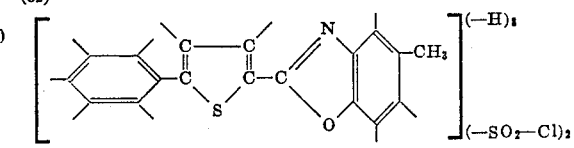

which melts at 175 to 182° C.

*Example 2*

17.65 parts of the compound of formula

(33) 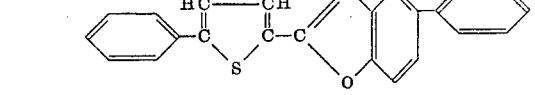

are treated as described in Example 1 with 66 parts by volume of chlorosulfonic acid and then with 27 parts by volume of thionyl chloride. Subsequently, the mixture is poured on to 800 parts of ice, suction-filtered and washed with water. After drying in vacuum at 70° C., 28 parts of a sulfonyl chloride-sulfonic acid mixture of melting point 290 to 300° C. are obtained.

The mixture is then heated in 100 parts of thionyl chloride for 90 minutes under reflux. After evaporation to dryness 28 parts of the compound of formula

(34) 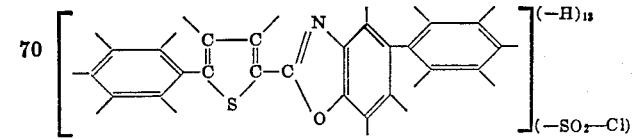

of melting point 237 to 240° C. are obtained.

Example 3

6 parts by volume of a 73% aqueous potassium fluoride solution, 50 parts by volume of xylene and 21.6 parts of the sulfonyl chloride of Formula 27 from Example 1 are boiled for one hour under reflux. After standing overnight, the mixture is filtered with suction, the yellow precipitate is washed with water and dried in vacuum at 60° C.

18.3 parts of the sulfonyl fluoride of formula

(35)
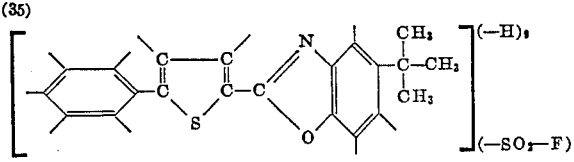

in the form of a yellow powder of melting point 205 to 210° C.

After three recrystallizations from pyridine and water the sulfonyl fluoride melts at 222 to 223° C. and shows the following analytical data:

$C_{21}H_{18}O_3NS_2F$—Calculated: C, 60.70%; H, 4.37%; N, 3.37%. Found: C, 60.25%; H, 4.37%; N, 3.46%.

Example 4

1 mole of sulfonyl chloride of Formula 25 or of Formula 27 is added to a mixture of a concentrated aqueous solution of ammonia (30 moles) and 20,000 parts by volume of ethanol. Then the mixture is stirred for two hours at 50 to 60° C. The sulfonamide is separated by cooling and evaporation of the solvent, and recrystallized from the specified solvent.

In this manner the sulfonamides of the following formula are obtained

(36)
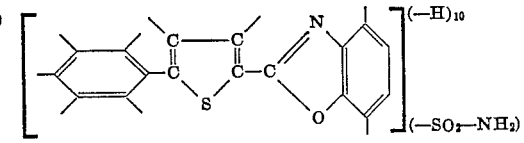

Light yellow crystals from dioxane. Melting point: 285 to 287° C.

$C_{17}H_{12}O_3N_2S_2$—Calculated: C, 57.29%; H, 3.39%; N, 7.86%; S, 17.99%. Found: C, 57.20%; H, 3.64%; N, 7.65%; S, 18.16%.

(37)
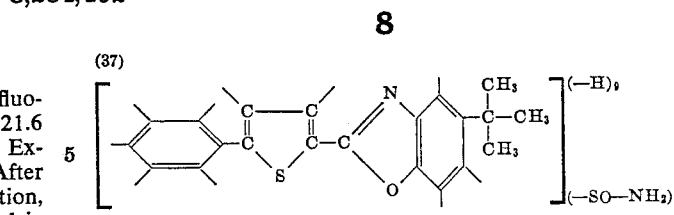

Yellowish crystals from butanol. Melting point: 209 to 212° C.

$C_{21}H_{20}O_3N_2S_2$—Calculated: C, 61.14%; H, 4.89%; N, 6.79%; S, 15.55%. Found: C, 61.05%; H, 4.92%; N, 6.56%; S, 15.32%.

If in this example instead of the sulfonyl chlorides of Formula 25 or 27 the mixture of the two sulfonyl chlorides of Formulae 31 and 32 described in Example 1 is used, a mixture of two sulfonamides of formulae

(38)
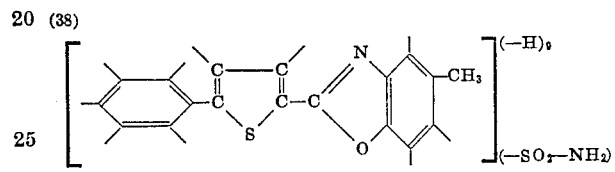

(39)
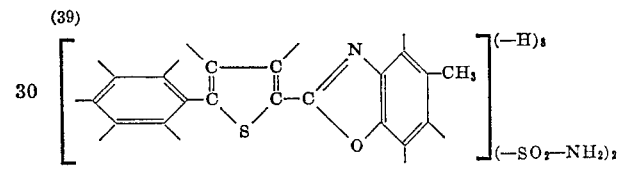

results which, after recrystallization from dioxane, is obtained in the form of light yellow crystals. It melts at 229 to 234° C.

Example 5

The compounds listed in Table I were obtained in accordance with the following general directions:

$\frac{1}{10}$ mole of sulfonyl chloride of Formula 25 is added to a solution of $\frac{1}{10}$ mole of the corresponding amine in 2000 parts by volume of ethanol and stirred for 2 hours at 50 to 60° C. The amide is separated by cooling and evaporation or by precipitation with water and recrystallized from the specified solvent.

(40)
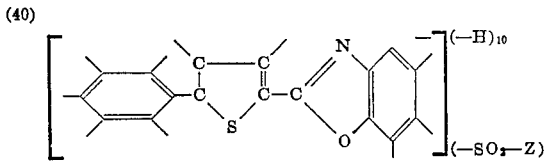

TABLE I

| No. | —Z | Characteristics | Analysis |
|---|---|---|---|
| 40a | —NH—(CH$_2$)$_7$—CH$_3$ | Yellowish crystals from perchloro ethylene. Melting point. 162 to 164° C. | $C_{25}H_{28}O_3N_2S_2$.—Calc.: C, 64.07; H, 6.02; N, 5.98; S, 13.68. Found: C, 64.09; H, 6.02; N, 5.86; S, 13.72. |
| 40b | —NH—(CH$_2$)$_{17}$—CH$_3$ | Colorless crystals from butanol. Melting point, 162 to 163° C. | $C_{35}H_{48}O_3N_2S_2$.—Calc.: C, 69.04; H, 7.95; N, 4.60; S, 10.53. Found: C, 68.93; H, 7.92; N, 4.76; S, 10.69. |
| 40c | —NH—CH$_2$—CH$_2$OH | Yellowish crystals from butanol. Melting point, 174 to 176° C. | $C_{19}H_{16}O_4N_2S_2$.—Calc.: C, 56.98; H, 4.03; N, 7.00; S, 16.01. Found: C, 57.09; H, 4.11; N, 6.80; 16.22. |
| 40d | —N(CH$_2$—CH$_2$OH)$_2$ | Yellowish crystals from ethanol. Melting point, 210 to 212° C. | $C_{21}H_{20}O_5N_2S_2$.—Calc.: C, 56.74; H, 4.54; N, 6.30; S, 14.43. Found: C, 56.80; H, 4.55; N, 6.35; S, 14.52. |
| 40e | —NH—(CH$_2$)$_2$—(O—CH$_2$CH$_2$)$_2$—OH | Yellowish crystals from perchloro ethylene. Melting point, 108 to 115° C. | $C_{24}H_{26}O_6N_2S_2$.—Calc. C, 57.35, H, 5.21; N, 5.57; S, 12.76. Found: C, 56.51; H, 5.22; N, 5.28; S, 12.99. |
| 40f | —NH—(CH$_2$)$_3$—N⟨CH$_2$—CH$_2$\\CH$_2$—CH$_2$⟩O | Yellowish crystals from perchloro ethylene. Melting point, 171 to 175° C. | $C_{24}H_{25}O_4N_3S_2$.—Calc. C, 59.61; H, 5.21; N, 8.68; S, 13.26. Found: C, 59.83; H, 5.20; N, 8.61; S, 13.24. |
| 40g | —NH—CH$_2$—CH=CH$_2$ | Yellowish crystals from dioxane. Melting point, 178 to 180° C. | $C_{20}H_{16}O_3N_2S_2$.—Calc. C, 60.59; H, 4.07; S, 16.17. Found: C, 60.57; H, 4.12; S, 16.25. |

In an analogous manner the sulfonamides listed in Table II of the general formula (41)

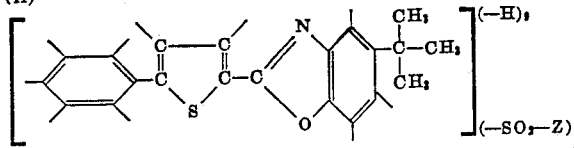

are obtained from the sulfonyl chloride of Formula 27 and an amine H—Z.

Light yellow crystals from butanol.
Melting point: 218 to 222° C.
$C_{23}H_{24}O_5N_2S_2$—Calculated: C, 58.46; H, 5.12; N, 5.93; S, 13.57. Found: C, 58.37; H, 5.12; N, 5.82; S, 13.69.

*Example 6*

The compounds listed in Table III are obtained in accordance with the following general directions:
1/10th mole of the sulfonyl chloride of Formula 34 is added to a solution of 2/10ths mole of the corresponding amine in 2000 parts by volume of ethanol and stirred for

TABLE II

| No. | —Z | Characteristics | Analysis |
|---|---|---|---|
| 41a | —NH—($CH_2$)$_{17}$—$CH_3$ | Colorless crystals from butanol. Melting point, 150 to 152° C. | $C_{39}H_{56}O_3N_2S_2$.—Calc.: C, 70.44; H, 8.49; N, 4.21; S, 9.64. Found: C, 70.30; H, 8.49; N, 4.15; S, 9.57. |
| 41b | —NH—$CH_2$—$CH_2OH$ | Yellowish crystals from butanol. Melting point, 190 to 193° C. | $C_{23}H_{20}O_4N_2S_2$.—Calc.: C, 60.50; N, 5.30; N, 6.14; S, 14.05. Found: C, 60.78; H, 5.30; N, 5.89; S, 13.96. |
| 41c | N($CH_2$—$CH_2OH$)$_2$ | Yellowish crystals from butanol. Melting point, 222 to 224° C. | $C_{25}H_{28}O_5N_2S_2$.—Calc.: C, 59.98; H, 5.64; N, 5.60; S, 12.81. Found: C, 60.30; H, 5.66; N, 5.62; S, 12.93. |
| 41d | —NH—$CH_2$—CH=$CH_2$ | Yellow crystals from methanol. Melting point, 194 to 196° C. | $C_{24}H_{24}O_3N_2S_2$.—Calc.: C, 63.69; H, 5.35; N, 6.19; S, 14.17. Found: C, 63.87; H, 5.30; N, 5.86; S, 14.32. |
| 41e | —NH—$CH_2$—$CH_2$—NH—CO—$OC_2H_5$ | Reddish crystals from butanol plus ethanol. Melting point, 170 to 173° C. | $C_{26}H_{29}O_5N_3S_2$.—Calc.: C, 59.18; H, 5.54; N, 7.86; S, 12.15. Found: C, 59.00; H, 5.50; N, 7.79; S, 12.04. |

In an analogous manner, the sulfonamides of the following formulae are obtained from the sulfonyl chloride of Formula 31 and n-octadecylamine or allylamine or from the sulfonyl chloride of Formula 29 with diethanolamine 2 hours at 50° to 60° C. The amide is separated by cooling, evaporating or precipitating with water and recrystalized from the specified solvent.

(42)

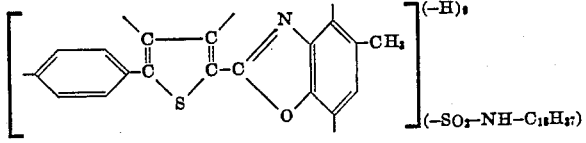

(45)

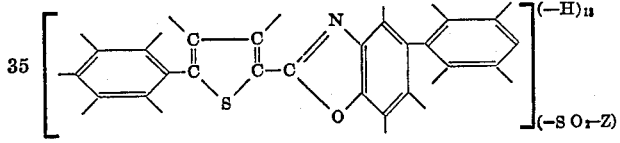

TABLE III

| No. | —Z | Characteristics | Analysis |
|---|---|---|---|
| 45a | —NH—($CH_2$)$_7$—$CH_3$ | Light yellow crystals from dioxane. Melting point, 246 to 249° C. | $C_{29}H_{40}O_5N_2S_2$.—Calc.: C, 63.64; H, 6.71; N, 5.71; S, 13.07. Found: C, 63.77; H, 6.67; N, 5.75; S, 12.65. |
| 45b | —NH—($CH_2$)17—$CH_3$ | Light yellow crystals from dioxane. Melting point, 218 to 222° C. | $C_{40}H_{60}O_5N_2S_2$.—Calc.: C, 69.71; H, 8.82; N, 4.13; S, 9.46. Found: C, 69.95; H, 8.68; N, 4.17; S, 9.64. |
| 45c | —NH—$CH_2$—$CH_2OH$ | Light yellow crystals from ethanol. Melting point, 263 to 268° C. | $C_{27}H_{25}O_7N_3S_3$.—Calc.: C, 54.06; H, 4.20; N, 7.01; S, 16.04. Found: C, 53.35; H, 4.20; N, 6.73; S, 16.29. |
| 45d | —N($CH_2$—$CH_2OH$)$_2$ | Light yellow crystals from dimethylsulfoxide/water. Melting point, 306 to 309° C. | $C_{31}H_{36}O_9N_3S_3$.—Calc.: C, 54.12; H, 4.83; N, 6.12; S, 13.96. Found: C, 54.13; H, 4.82; N, 5.90; S, 13.90. |
| 45e | —NH—$CH_2$—CH=$CH_2$ | Light yellow crystals from ethanol. Melting point, 213 to 216° C. | $C_{29}H_{25}O_5N_3S_3$.—Calc.: C, 58.86; H, 4.26; N, 7.10; S, 16.26. Found: C, 59.30; H, 4.40; N, 6.83; S, 15.64. |

Light yellow crystals from butanol.
Melting point: 144 to 149° C.
$C_{36}H_{50}O_3N_2S_2 \cdot \frac{1}{2}H_2O$—Calculated: C, 6.42; H, 8.13; N, 4.43; S, 10.16. Found: C, 68.53; H, 8.43; N, 4.43; S, 10.21.

(43)

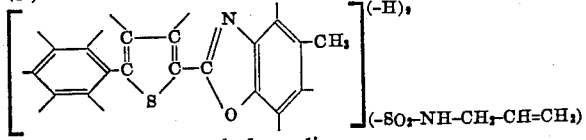

Light yellow crystals from dioxane.
Melting point 202 to 204° C.
$C_{23}H_{24}O_5N_2S_2$—Calculated: C, 58.46; H, 5.12; N, 5.93; Found: C, 61.52; H, 4.40; S, 15.33.

(44)

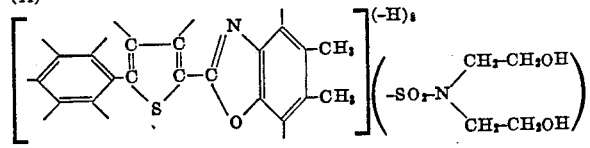

In an analogous manner the sulfonamide of the following formula is obtained from the sulfonyl chloride of Formula 32 and n-octylamine:

(46)

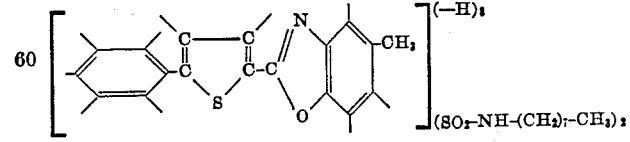

Slightly greenish crystals from dioxane.
Melting point: 210 to 212° C.
$C_{34}H_{47}O_5N_3S_3$—Calculated: C, 60.59; H, 7.04; N, 6.23; S, 14.27. Found: C, 60.36; H, 6.90; N, 6.09; S, 14.51.

*Example 7*

A solution of 3.76 parts of the sulfonyl chloride of Formula 25 in 40 parts by volume of acetone is added to a solution of 3 parts of amino acetic acid in 40 parts by volume of aqueous 1 N-sodium hydroxide solution and the mixture is stirred at room temperature (approx. 18°

C.). Aqueous 1 N-sodium hydroxide solution is added in such a way that the mixture always reacts slightly alkaline (pH 8 to 9). After approx. one hour the suspension has become very thick and the absorption of sodium hydroxide solution stops at 13 parts by volume.

The paste is introduced into 150 parts by volume of 5% hydrochloric acid, the mixture is filtered with suction, the precipitate washed with water and crystallized twice from hot ethanol. The compound of formula (47)

$$\left[ \underset{S}{\overset{C-C}{\underset{C-C}{\bigvee}}} \underset{O}{\overset{N}{\bigvee}} \right]_{(-SO_2-NH-CH_2-COOH)}^{(-H)_{10}}$$

is obtained in the form of light beige crystals which melt at 248 to 250° C.

$C_{19}H_{14}O_5N_2S_2$—Calculated: C, 55.06; H, 3.40; N, 6.76; S, 15.47. Found: C, 55.11; H, 3.52; N, 6.77; S, 15.32.

In a similar manner the compound of formula (48)

$$\left[ \underset{S}{\overset{C-C}{\underset{C-C}{\bigvee}}} \underset{O}{\overset{N}{\bigvee}} \right]_{(-SO_2-NH-(CH_2)_5-COOH)}^{(-H)_{10}}$$

is obtained from the sulfonyl chloride of Formula 25 and amino caproic acid.

Light beige crystals from dioxane.
Melting point: 182 to 184° C.

$C_{23}H_{22}O_5N_2S_2$—Calculated: C, 58.71; H, 4.71; N, 5.95; S, 13.63. Found: C, 58.44; H, 4.88; N, 6.04; S, 13.46.

*Example 8*

A mixture of 3.76 parts of sulfonyl chloride of Formula 25, 50 parts of volume of benzene and 3.3 parts of anhydrous aluminum chloride is heated to 70° C. when evolution of hydrogen chloride commences. The mixture is stirred at this temperature until HCl-evolution ceases and then cooled to 20° C. 100 parts by volume of 5% hydrochloric acid are added and stirring continued for 10 minutes. The mixture is then shaken with 300 parts by volume of ethyl acetate, the ethyl acetate extract dried with sodium sulfate and evaporated in vacuum.

2.4 parts of the compound of formula (49)

$$\left[ \underset{S}{\overset{C-C}{\underset{C-C}{\bigvee}}} \underset{O}{\overset{N}{\bigvee}} \right]_{(-SO_2-\bigcirc)}^{(-H)_{10}}$$

are obtained as a yellow powder of melting point 160 to 168° C. Three recrystallizations from chlorobenzene+petroleum ether yield yellow crystals of melting point 239 to 240.5°.

$C_{23}H_{15}O_3NS_2$—Calculated: C, 66.17; H, 3.62; N, 3.35; S, 15.36. Found: C, 66.05; H, 3.73; N, 3.27; S, 15.32.

*Example 9*

20 parts of the sulfonyl chloride of Formula 27 are added to a solution of 1.22 parts of metallic sodium in 500 parts by volume of ethanol. Stirring is continued for 3 hours at 3 to 5° C. The mixture is allowed to stand overnight and warmed up to room temperature (18° C.). 500 parts of water are added and the precipitate is filtered with suction. After drying 16.6 parts of the sulfonic acid ethyl ester of the formula (50)

$$\left[ \underset{S}{\overset{C-C}{\underset{C-C}{\bigvee}}} \underset{O}{\overset{N}{\bigvee}} \overset{CH_3}{\underset{CH_3}{\overset{|}{C-CH_3}}} \right]_{(-SO_2-O-CH_2-CH_3)}^{(-H)_9}$$

are obtained in the form of a light yellow powder of melting point 139 to 142° C.

A sample, after two recrystallizations from n-butanol, melts at 140 to 142° C. and shows the following analytical data:

$C_{23}H_{23}O_4NS_2$—Calculated: C, 62.56; H, 5.25; N, 3.17; S, 14.52. Found: C, 62.44; H, 5.37; N, 3.25; S, 14.74

*Example 10*

4.32 parts of the sulfonyl chloride of Formula 27 are added to a solution stirred at 0° C. of 3.8 parts of phenol in 20 parts by volume of pyridine. The mixture is heated to 100° C. in the course of one hour, maintained and stirred at this temperature for 30 minutes, then chilled and mixed with 100 parts of water. After filtration by suction, washing and drying, 3.2 parts of a compound of formula (51)

$$\left[ \underset{S}{\overset{C-C}{\underset{C-C}{\bigvee}}} \underset{O}{\overset{N}{\bigvee}} \overset{CH_3}{\underset{CH_3}{\overset{|}{C-CH_3}}} \right]_{(-SO_2-O-\bigcirc)}^{(-H)_9}$$

are obtained in the form of a beige powder of melting point 157 to 164° C. Three recrystallizations from n-butanol lead to yellowish crystals of melting point 174 to 176° C. which show the following analytical data:

$C_{27}H_{23}O_4NS_2$—Calculated: C, 66.24; H, 4.74; N, 2.86; S, 13.10. Found: C, 66.29; H, 4.71; N, 2.87; S, 13.04.

*Example 11*

7 parts of the compound of formula (52)

$$\underset{\bigcirc}{\overset{HC-CH}{\underset{S}{\overset{\diagup\diagdown}{C-C}}}} \underset{O}{\overset{N}{\bigvee}} SO_2Cl$$

are dissolved in 150 parts by volume of hot anhydrous dioxane and the resulting clear solution is cooled to room temperature. To this solution are added 50 parts by volume of 24% ammonia, the mixture heated under reflux for one half hour, and the resulting suspension cooled to room temperature, filtered by suction and the residue washed with alcohol and ether.

5.5 parts, corresponding to 83% of the theory, of the compound of formula (53)

$$\underset{\bigcirc}{\overset{HC-CH}{\underset{S}{\overset{\diagup\diagdown}{C-C}}}} \underset{O}{\overset{N}{\bigvee}} SO_2-NH_2$$

are obtained in the form of a light yellow powder which melts at 282 to 283° C. After two recrystallizations from dioxane/water with the help of activated charcoal, light yellow very fine crystals, melting at 282 to 283° C., are obtained.

*Analysis.*—$C_{17}H_{12}O_3S_2N_2$—Calculated: C, 57.29; H, 3.39; N, 7.86; S, 17.99. Found: C, 57.39; H, 3.57; N, 7.94; S, 17.53.

The compound of Formula 52 used as starting material can be prepared as follows:

22.3 parts of the compound of formula

(54) 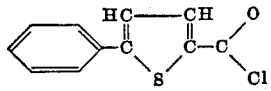

18.9 parts of finely powdered, 2-aminophenol-4-sulfonic acid and 2 parts of pyridine are suspended in 500 parts by volume of o-dichlorobenzene. The reaction mixture is stirred in a nitrogen current under reflux, hydrochloric acid being evolved. After the evolution of hydrochloric acid has ceased (approx. 14 hours), the reaction mixture is cooled to 0° C., and the precipitate is filtered off by suction.

Approx. 27 parts, corresponding to 72% of the theory of the compound of formula

(55) 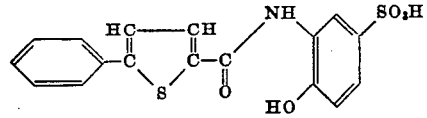

are obtained in form of a yellow-green powder which melts at 281° C. with decomposition.

27 parts of the carboxylic acid amide of Formula 55 are dissolved in 200 parts by volume of freshly distilled phosphorus oxychloride. 15 parts of phosphorus penta-chloride are added and the mixture is boiled under reflux. When the evolution of hydrochloric acid has ceased (approx. 17 hours) the reaction mixture is evaporated to dryness in vacuum. The residue is boiled twice with 500 parts by volume of anhydrous dioxane. The dioxane solutions are combined and 1000 parts by volume of water are added at 10° C. The crystalline precipitate is filtered with suction, washed first with water and then with alcohol, and dried in vacuum at 60° C. 15 parts, corresponding 55.5% of the theory, of the compound of Formula 52 are obtained in the form of a pale yellow powder which melts at 179 to 181° C. After one recrystallization from dioxane with the help of activated charcoal, light yellow needles, melting at 191 to 192° C., are obtained.

*Analysis.*—$C_{17}H_{10}NO_3S_2Cl$—Calculated: C, 54.33; H, 2.68; N, 3.73; Cl, 9.43; S, 17.06. Found: C, 54.30; H, 2.91; N, 3.75; Cl, 9.40; S, 17.22.

Example 12

5 parts of the compound of Formula 52 are boiled under reflux for one hour with 100 parts by volume of monoethylamine (70%). The reaction mixture is cooled to room temperature and the precipitate is filtered with suction.

Approx. 4 parts, corresponding to 78% of the theory, of the compound of formula

(56) 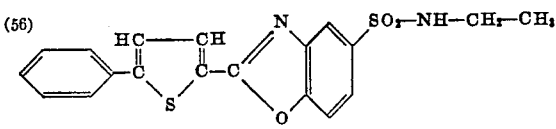

are obtained in the form of a light yellow powder which melts at 179 to 180° C. After two recrystallizations from methylene chloride+methanol, light yellow crystals are obtained with the held of activated charcoal, which melt at 181 to 182° C.

*Analysis.*—$C_{19}N_{16}N_2O_3S_2$—Calculated: C, 59.36; H, 4.19; N, 7.29; S, 16.68. Found: C, 59.38; H, 4.27; N, 7.23; S, 16.61.

In an analogous manner, a sulfonamide of the following formula is obtained from the aforementioned starting material of Formula 52.

(57) 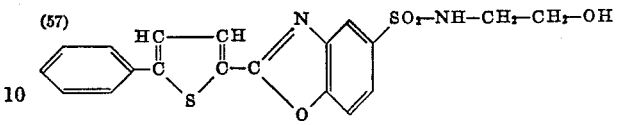

Yield: 80% of the theory.
Light yellow needles from dioxane.
Melting point: 195 to 196° C.

*Analysis.*—$C_{19}H_{16}O_4N_2S_2$—Calculated: C, 56.98; H, 4.03; S, 16.01. Found: C, 57.05; H, 4.18; S, 16.04.

In an analogous manner in the sulfonamide of the following formula is obtained from the compound of Formula 52.

(58) 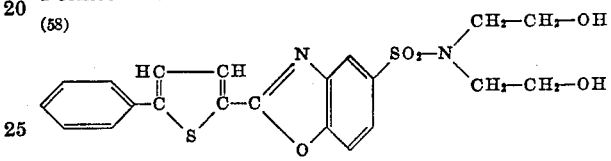

Yield: 95% of theory.
Light yellow powder from alcohol.
Melting point: 162 to 164° C.

*Analysis.*—$C_{21}H_{20}O_5S_2N_2$—Calculated: C, 56.74; H, 4.54; N, 6.30; S, 14.43. Found: C, 56.79; H, 4.76; N, 6.52; S, 14.49.

Example 13

100 parts of polyamide fabric e.g. "Nylon-Spun" are introduced into a bath at 60° C. which is composed of 4000 parts of water;
8 parts of a dispersing agent (addition product of 35 mole of ethylene oxide and 1 mole of octadecy alcohol); and
0.1 part of the compound of Formula 45c.

The bath is then heated to boiling, and the fabric is treated at boiling temperature for 1 hour. The fabric is then rinsed and dried. The fabric so treated presents a substantially higher degree of whiteness than the untreated fabric.

If, in this example, the compound of Formula 41b is used instead of the compound of Formula 45c good brightening effects are also obtained.

Example 14

A bleached cotton fabric is treated at a ratio of goods to liquor of 1:30 for one-half at 20 to 50° in a bath which contains 1.5%, referred to the textile material, of the compound of Formula 38 or 39, or of a mixture of these two compounds, and 5 g. of crystalline sodium sulfate per liter.

After rinsing and drying, the cotton material treated presents a higher degree of whiteness than the untreated starting material.

Example 15

100 parts of polyvinyl chloride; 54 parts of dioctyl phthalate; 2 parts of titanium dioxide; and 0.2 parts of a compound of Formula 46 are carefully mixed and rolled to a foil on a calender at 150 to 160° C.

The polyvinyl chloride foil so obtained has a considerably higher degree of whiteness than a foil which does not contain the thiophene compound.

Example 16

A fabric of polyethylene glycol terephthalate (e.g. "Dacron") is treated on the padding mangle with an aqueous dispersion which contains per liter of water 2 g. of the compound of Formula 49. After drying at 70°

15

C. and subsequent heating to 160° C. for one minute, the treated fabric shows a higher degree of whiteness than the untreated fabric.

A similar brightening effect is obtained e.g. with the compound for Formula 40a.

Example 17

Polypropylene powder is mixed with 0.1% of the optical brightening agent of Formula 40b or 41a and spun in the normal way on a spinneret at 270° C.

The thread so obtained has a considerably higher degree of whiteness than one manufactured in the same way but without the optical brightening agent.

Example 18

Cotton is washed at a ratio of goods to liquid of 1:40, at 60 to 65° C. in a bath which contains 10 g. of a detergent of the following composition:

|  | Percent |
|---|---|
| Soap | 33.3 |
| Anhydrous sodium carbonate | 11.0 |
| Sodium pyrophosphate | 14.0 |
| Sodium perborate | 7.0 |
| Magnesium silicate | 3.0 |
| Compound of Formula 45c | 0.5 |
| Water | 31.2 |
|  | 100.0 |

The material is then rinsed and dried. The so treated cotton has an excellent brighteners effect of good fastness to light, acid and chlorine.

The optical brightening effect is not in any way diminished by the use of reagents giving off chlorine during the washing process.

If, instead of the detergent of the aforementioned composition, an agent is used which consists of anion-active, non-ionic or cation-active, liquid or solid synthetic detergent compounds, similar brighteners effects are achieved.

The washing process described above may also be carried out at boiling temperature.

Example 19

10 parts of the compound of Formula 52 are boiled under reflux for two hours with 50 parts by volume of pyridine. The reaction mixture is cooled to 50° C., treated with 20 parts of water at this temperature and boiled for a further two hours under reflux.

After removal of the solvent mixture in vacuum approx.

(62)

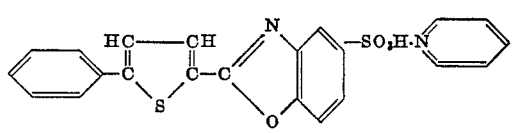

10 parts, corresponding to 86% of the theory, of the compound of formula (59)

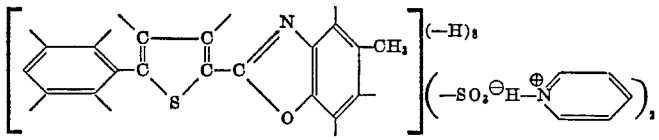

are obtained in the form of a light yellow crystalline powder which melts at 253 to 258° C. After three recrystallizations from alcohol+water, with the help of activated charcoal, very fine light yellow needles of melting point 261 to 263° C. are obtained.

Analysis.—$C_{22}H_{16}N_2O_4S_2$—Calculated: C, 60.53; H, 3.69; N, 6.42; S, 14.69. Found: C, 60.37; H, 3.53; N, 6.37; S, 14.93.

16

Example 20

10 parts of the compound of Formula 59 are mixed with 50 parts of volume of 2 N NaCH and heated at 80° C, when a clear solution is formed. The warm solution is slowly treated with alcohol until fine crystals precipitate.

9 parts, corresponding to 90% of the theory, of the compound of formula (60)

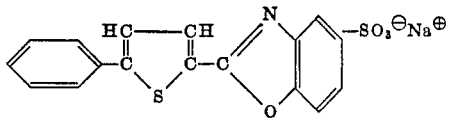

are obtained in the form of ligth yellow crystals which melt above 360° C. After two recrystallizations from water/alcohol light yellow crystals are obtained with the help of activated charcoal which melt above 360° C.

Analysis.—$C_{17}H_{10}O_4NS_4Na$—Calculated: C, 53.82; H, 2.66; N, 3.69; S, 16.90. Found: C, 54.19; H, 2.83; N, 3.56; S, 16.72.

Example 21

13.8 parts of the compound of Formula 24 are introduced into 66 parts by volume of ice-cold chlorosulfonic acid. The mixture is then stirred for 15 minutes at 15° C., poured on to 800 parts of ice. The yellow precipitate is filtered and washed with water. The moist residue on the filter is boiled in 150 parts of pyridine for 5 minutes under reflux and the mixture is reduced to dryness in vacuum. The smeary residue is dissolved in 350 parts of water, the solution treated with activated charcoal and after filtration again evaporated to dryness. 25.2 parts of the crude compound formula (61)

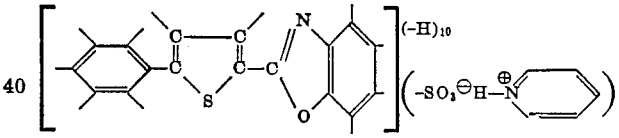

are obtained as brown-yellow amorphous paste. After four recrystallizations from hot pyridine light yellow crystals of melting point 235–239° C. are obtained which show the following analytical data:

$C_{22}H_{16}O_4N_2S_2$—Calculated: C, 60.53; H, 3.69; N, 6.42; S, 14.70. Found: C, 60.34; H, 3.68; N, 6.52; S, 14.67.

In an analogous manner the pyridine salt of the following formula is obtained from the compound of Formula 30.

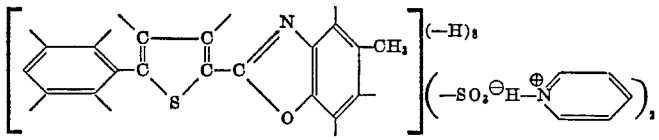

in the firm of light yellow crystals from methanol of melting point 268–275° C.

$C_{28}H_{23}O_7N_3S_2$—Calculated: C, 55.16; H, 3.80; N, 6.89; S, 15.78. Found: C, 55.29; H, 3.86; N, 6.74; S, 16.03.

In an analogous manner the pyridine salt of the following formula is obtained from the compound of Formula 28

(63)

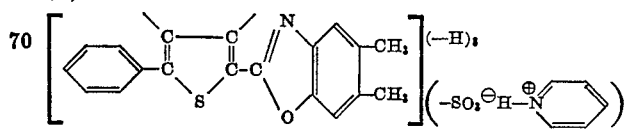

in the form of light yellow crystals from hot water of melting point 280–282° C.

$C_{24}H_{20}O_4N_2S_2$—Calculated: C, 62.05; H, 4.34; N, 6.03; S, 13.80. Found: C, 62.23; H, 4.33; N, 6.12; S, 13.67.

In an analogous manner the pyridine salt of the following formula is obtained from the compound of Formula 33

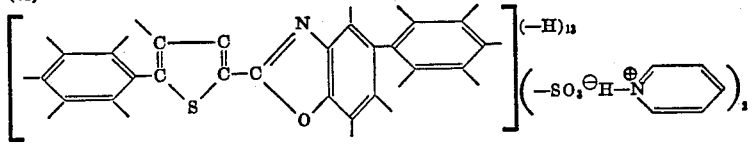
(64)

as a light yellow powder of melting point 318–324° C. $C_{33}H_{25}O_7N_3S_3$—Calculated: C, 58.99; H, 3.75; N, 6.27; S, 14.31. Found: C, 59.08; H, 3.77; N, 6.34; S, 14.32.

*Example 22*

17.67 parts of the compound of Formula 33 are heated in 50 parts by volume of concentrated sulfuric acid to 60° C. and stirred for 30 minutes at 60–70° C. After cooling, the solution is poured on to ice; the yellow precipitate is centrifuged and washed with water. The moist product is boiled for 5 minutes in 50 parts of pyridine under reflux, then dissolved with the help of the addition of 35 parts of water, and the solution is treated with 200 parts by volume of ethanol.

The compound of the formula

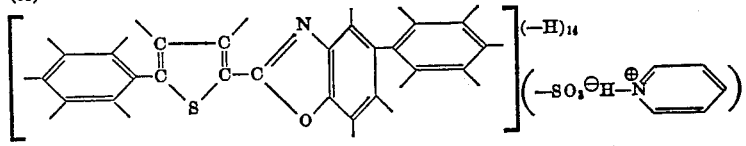
(65)

is obtained as a light yellow powder which, after recrystallization from water+alcohol, melts at 264–268° C. and gives the following analytical data:

Calculated: C, 65.61; H, 3.93; S, 12.51. Found: C, 64.65; H, 3.92; S, 12.79.

The sodium salt is obtained as a light beige powder by being salted out with sodium chloride from an aqueous solution of the pyridine salt. The product is suitable as an optical brightening agent for detergents.

What is claimed is:
1. A thiophene compound of the formula

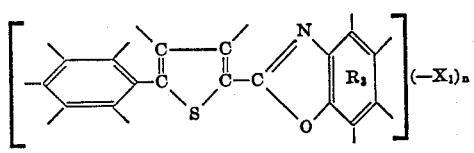

wherein the benzene ring $R_3$ may contain a member selected from the group consisting of a phenyl group and 1 to 2 alkyl groups having from 1 to 4 C-atoms, $n$ stands for a whole number from 1 to 2, and $X_1$ indicates a member selected from the group consisting of a sulfonyl chloride, a sulfonyl fluoride group, a lower alkyl sulfonate group, a phenyl sulfonate group, a sulfonamide group of the formula

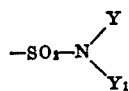

and a radical of the formula $$-SO_2-W_1$$

wherein Y stands for a member selected from the group consisting of a hydrogen atom and a hydroxyethyl group and $Y_1$ stands for a member selected from the group consisting of a hydrogen atom, an alkyl, alkenyl, hydroxyalkyl, carboxyalkyl and an alkoxyalkyl group each containing up to 20 C-atoms, an amino alkyl group which may be further substituted on the nitrogen atom, wherein $W_1$ stands for a phenyl radical, and wherein the remaining valencies carry hydrogen atoms.

2. A thiophene compound of the formula

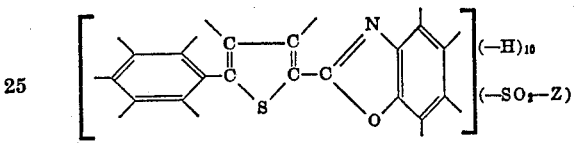

wherein Z stands for a member selected from the group consisting of $-NH-(CH_2)_7-CH_3$
$-NH-(CH_2)_{17}-CH_3$
$-NH-CH_2-CH_2OH$
$-N(CH_2-CH_2OH)_2$
$-NH-(CH_2)_2-(O-CH_2CH_2)_2-OH$

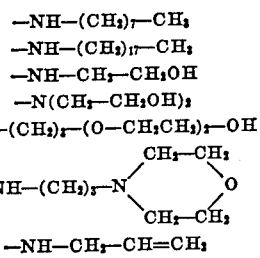

$-NH-CH_2-CH=CH_2$

3. A thiophene compound of the formula

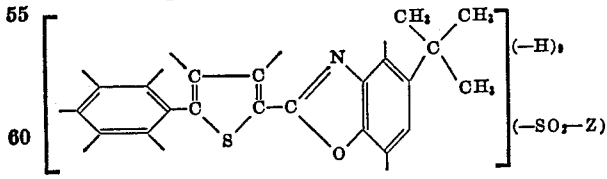

wherein Z stands for a member selected from the group consisting of $-NH-(CH_2)_7-CH_3$
$-NH-(CH_2)_{17}-CH_3$
$-NH-CH_2-CH_2OH$
$-N(CH_2-CH_2OH)_2$
$-NH-(CH_2)_2-(O-CH_2CH_2)_2-OH$

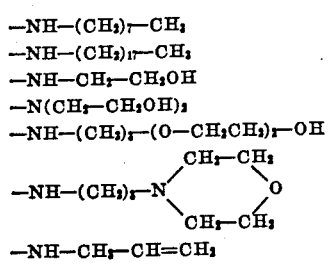

$-NH-CH_2-CH=CH_2$

4. A thiophene compound of the formula

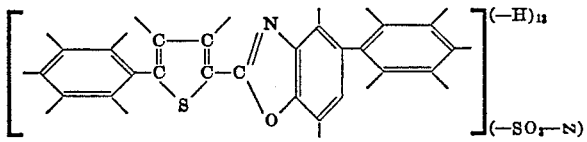

wherein Z stands for a member selected from the group consisting of

—NH—(CH₂)₇—CH₃
—NH—(CH₂)₁₁—CH₃
—NH—CH₂—CH₂OH
—N(CH₂—CH₂OH)₂
—NH—(CH₂)₂—(O—CH₂CH₂)₂—OH

—NH—(CH₂)₂—N⟨CH₂—CH₂⟩O⟨CH₂—CH₂⟩

—NH—CH₂—CH=CH₂

5. A thiophene compound of the formula

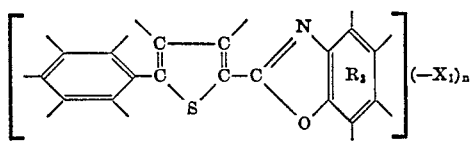

wherein the benzene ring R₃ may contain a member selected from the group consisting of a phenyl group and 1 to 2 alkyl groups having from 1 to 4 C-atoms, *n* stands for a whole number from 1 to 2 and X₁ represents a group

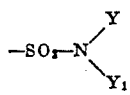

wherein Y represents a hydrogen atom and Y₁ a member selected from the group consisting of an alkyl group, an alkoxyalkyl group, a carboxyalkyl group, a hydroxyalkyl group, each group containing up to 20 carbon atoms, an amino alkyl group of one of the formulae

—CH₂—CH₂—CH₂—NH₂

—CH₂—CH₂—CH₂—N⟨CH₃⟩⟨CH₃⟩

—CH₂—CH₂—CH₂—N⟨CH₂—CH₂⟩O⟨CH₂—CO₂⟩ and

—CH₂—CH₂—NH—COOC₂H₅ and the remaining valencies in said general formula carry hydrogen atoms.

6. The compound of the formula

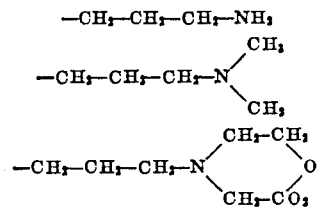

7. A thiophene compound of the formula

wherein the benzene ring R₃ may contain a member selected from the group consisting of a phenyl group and 1 to 2 alkyl groups having from 1 to 4 C-atoms, *n* stands for a whole number from 1 to 2 and X₁ represents a member selected from the group consisting of a sulfonyl chloride group, a sulfonyl fluoride group and an unsubstituted sulfonamide group, and the remaining valencies in said formula carry hydrogen atoms.

8. The thiophene compound of the formula

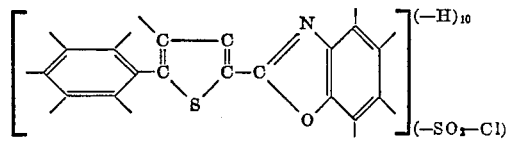

9. The thiophene compound of the formula

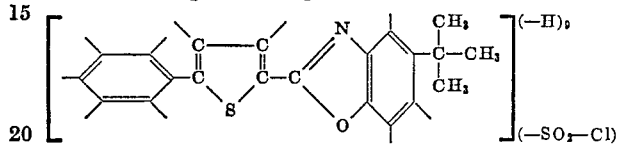

10. The thiophene compound of the formula

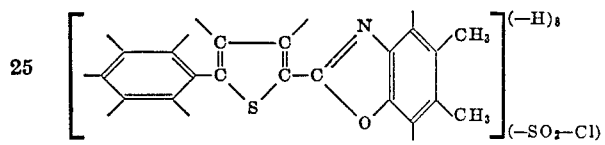

11. The thiophene compound of the formula

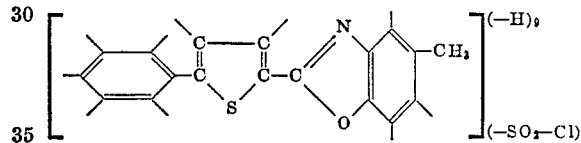

12. The thiophene compound of the formula

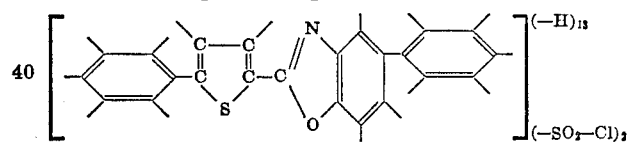

13. The thiophene compound of the formula

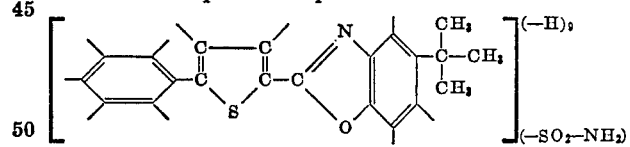

14. The compound of the formula

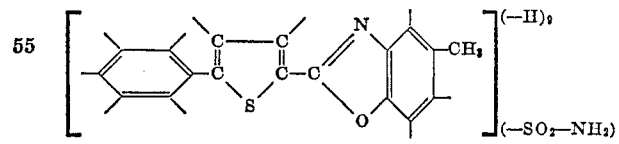

15. The compound of the formula

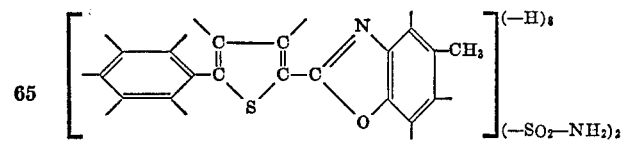

16. A thiophene compound of the formula

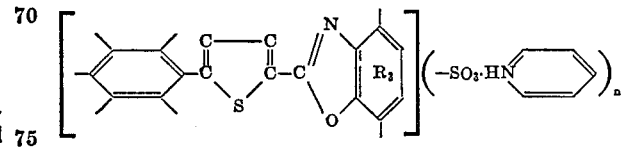

wherein the benzene ring $R_3$ may contain a member selected from the group consisting of a phenyl group and 1 to 2 alkyl groups having from 1 to 2 carbon atoms and $n$ stands for a whole number from 1 to 2, and wherein in said formula the remaining valencies carry hydrogen atoms.

References Cited by the Examiner

UNITED STATES PATENTS

| | | | |
|---|---|---|---|
| 2,985,661 | 5/1961 | Hein et al. | 260—307.4 |
| 3,005,779 | 10/1961 | Ackerman et al. | 252—301.2 |
| 3,127,416 | 3/1964 | Liechti et al. | 260—307 |
| 3,137,655 | 6/1964 | Taul et al. | 252—301.2 |
| 3,178,445 | 4/1965 | Maeder et al. | 260—307 |

ALEX MAZEL, *Primary Examiner.*

HENRY R. JILES, *Examiner.*

ALTON D. ROLLINS, RICHARD J. GALLAGHER,
*Assistant Examiners.*